United States Patent
Ferguson

(10) Patent No.: US 7,063,466 B2
(45) Date of Patent: Jun. 20, 2006

(54) SELECTABLE AND TUNABLE FERRULE HOLDER FOR A FIBER FABRY-PEROT FILTER

(75) Inventor: Stephen K. Ferguson, Lawrenceville, GA (US)

(73) Assignee: Micron Optics, Inc., Atlanta, GA (US)

( * ) Notice: Subject to any disclaimer, the term of this patent is extended or adjusted under 35 U.S.C. 154(b) by 0 days.

(21) Appl. No.: 10/742,599

(22) Filed: Dec. 18, 2003

(65) Prior Publication Data

US 2004/0151438 A1   Aug. 5, 2004

Related U.S. Application Data

(60) Provisional application No. 60/435,425, filed on Dec. 20, 2002.

(51) Int. Cl.
*G02B 6/38*   (2006.01)
(52) U.S. Cl. .......................................... 385/78; 385/58
(58) Field of Classification Search ................ 385/78, 385/60, 58, 72, 73, 75, 77
See application file for complete search history.

(56) References Cited

U.S. PATENT DOCUMENTS

| | | | |
|---|---|---|---|
| 3,984,190 A | 10/1976 | Barrett et al. | |
| 4,258,977 A | 3/1981 | Lukas | |
| 4,358,851 A | 11/1982 | Scifres | |
| 4,448,482 A | 5/1984 | Lathlaen | |
| 4,482,248 A | 11/1984 | Papuchon et al. | |
| 4,490,007 A | 12/1984 | Murata | |
| 4,530,097 A | 7/1985 | Stokes | |
| 4,545,644 A | 10/1985 | DeVeau, Jr. | |
| 4,629,284 A | 12/1986 | Malavieille | |
| 4,680,767 A | 7/1987 | Hakimi | |
| 4,780,877 A | 10/1988 | Snitzer | |
| 4,782,491 A | 11/1988 | Snitzer | |
| 4,787,701 A | 11/1988 | Stenger | |
| 4,806,012 A | 2/1989 | Meltz | |
| 4,813,756 A | 3/1989 | Frenkel | |

(Continued)

FOREIGN PATENT DOCUMENTS

EP   0 437 963 A2   7/1991

(Continued)

OTHER PUBLICATIONS

Arya, V. et al., "Temperature Compensation Scheme for Refractive Index Grating-Based Optical Fiber Devices," SPIE 2594:52-59.

(Continued)

*Primary Examiner*—Chandrika Prasad
(74) *Attorney, Agent, or Firm*—Greenlee, Winner and Sullivan, P.C.

(57) ABSTRACT

The invention relates generally to optical interference filters and interferometers. Methods, devices and device components for fiber Fabry-Perot (FFP) filters and ferrule holders are provided. The invention provides ferrule holders for FFP filters capable of good radial and longitudinal alignment. An exemplary ferrule holder of the present invention is capable of substantially constraining the motion of a pair of ferrules in all directions except a direction parallel to the longitudinal axis, thereby allowing the resonance cavity of a FFP filter to be adjusted while maintaining good radial alignment. The invention further provides temperature compensated ferrule holders and FFP filters that are stable with respect to wavelength drift over a useful range of device operating conditions. In addition, the present invention provides ferrule holders and FFP filters which are particularly useful for monitoring ambient conditions and measuring physical properties and mechanical phenomena.

45 Claims, 5 Drawing Sheets

U.S. PATENT DOCUMENTS

| Patent No. | | Date | Inventor | Ref |
|---|---|---|---|---|
| 4,830,451 A | | 5/1989 | Stone | |
| 4,848,499 A | | 7/1989 | Martinet | |
| 4,848,999 A | | 7/1989 | Taylor | |
| 4,861,136 A | | 8/1989 | Stone | |
| 4,892,388 A | | 1/1990 | Taylor | |
| 4,923,273 A | | 5/1990 | Taylor | |
| 4,932,033 A | | 6/1990 | Miyazawa | |
| 4,955,025 A | | 9/1990 | Mears | |
| 4,969,705 A | * | 11/1990 | Stoy et al. | 385/96 |
| 4,982,406 A | | 1/1991 | Facklam | |
| 4,996,419 A | | 2/1991 | Morey | |
| 5,007,705 A | | 4/1991 | Morey | |
| 5,024,505 A | | 6/1991 | Junji et al. | |
| 5,027,435 A | | 6/1991 | Chraplyvy et al. | |
| 5,037,176 A | | 8/1991 | Roberts et al. | |
| 5,037,179 A | | 8/1991 | Bortolin | |
| 5,037,180 A | | 8/1991 | Stone | |
| 5,042,898 A | | 8/1991 | Morey | |
| 5,050,949 A | | 9/1991 | DiGiovanni | |
| 5,062,684 A | | 11/1991 | Clayton | |
| 5,073,004 A | | 12/1991 | Clayton | |
| 5,115,441 A | | 5/1992 | Kopf | |
| 5,132,976 A | | 7/1992 | Chung | |
| 5,146,527 A | | 9/1992 | Mallinson | |
| 5,159,655 A | | 10/1992 | Ziebol | |
| 5,179,608 A | * | 1/1993 | Ziebol et al. | 385/81 |
| 5,181,213 A | | 1/1993 | Shinokura | |
| 5,208,886 A | | 5/1993 | Clayton | |
| 5,212,745 A | | 5/1993 | Miller | |
| 5,212,746 A | | 5/1993 | Miller | |
| 5,227,857 A | | 7/1993 | Kersey | |
| 5,237,630 A | | 8/1993 | Hogg | |
| 5,243,610 A | | 9/1993 | Murata | |
| 5,251,275 A | | 10/1993 | Kuriyama | |
| 5,283,845 A | | 2/1994 | Ip | |
| 5,289,552 A | * | 2/1994 | Miller et al. | 385/73 |
| 5,301,201 A | | 4/1994 | Dutta | |
| 5,305,336 A | | 4/1994 | Adar | |
| 5,359,687 A | | 10/1994 | McFarland et al. | |
| 5,361,130 A | | 11/1994 | Kersey | |
| 5,365,539 A | | 11/1994 | Mooradian | |
| 5,367,589 A | | 11/1994 | MacDonald | |
| 5,375,181 A | | 12/1994 | Miller | |
| 5,380,995 A | | 1/1995 | Udd | |
| 5,381,230 A | | 1/1995 | Blake | |
| 5,381,426 A | | 1/1995 | Fontana | |
| 5,381,500 A | | 1/1995 | Edwards | |
| 5,397,739 A | | 3/1995 | Chalmers | |
| 5,397,891 A | | 3/1995 | Udd | |
| 5,401,956 A | | 3/1995 | Dunphy | |
| 5,410,404 A | | 4/1995 | Kersey | |
| 5,422,470 A | | 6/1995 | Kubo | |
| 5,422,970 A | | 6/1995 | Miller | |
| 5,425,039 A | * | 6/1995 | Hsu et al. | 372/6 |
| 5,426,297 A | | 6/1995 | Dunphy | |
| 5,450,515 A | * | 9/1995 | Bechtel et al. | 385/94 |
| 5,469,455 A | | 11/1995 | Reitz | |
| 5,469,520 A | | 11/1995 | Morey | |
| 5,504,771 A | | 4/1996 | Vahala | |
| 5,509,093 A | | 4/1996 | Miller | |
| 5,513,913 A | | 5/1996 | Ball | |
| 5,530,715 A | | 6/1996 | Shieh | |
| 5,563,973 A | | 10/1996 | Miller | |
| 5,588,013 A | | 12/1996 | Reitz | |
| 5,591,965 A | | 1/1997 | Udd | |
| 5,602,949 A | | 2/1997 | Epworth | |
| 5,615,224 A | | 3/1997 | Cohen | |
| 5,617,434 A | | 4/1997 | Tamura | |
| 5,619,368 A | | 4/1997 | Swanson | |
| 5,650,856 A | | 7/1997 | Morse | |
| 5,666,373 A | | 9/1997 | Sharp | |
| 5,682,237 A | | 10/1997 | Belk | |
| 5,694,503 A | | 12/1997 | Fleming | |
| 5,703,978 A | | 12/1997 | DiGiovanni | |
| 5,713,753 A | * | 2/1998 | Bayer et al. | 439/369 |
| 5,721,802 A | | 2/1998 | Francis | |
| 5,732,169 A | | 3/1998 | Riant | |
| 5,734,667 A | | 3/1998 | Esman | |
| 5,739,945 A | | 4/1998 | Tayebati | |
| 5,762,515 A | * | 6/1998 | Mele | 439/367 |
| 5,796,894 A | | 8/1998 | Csipkes et al. | |
| RE035,962 E | | 11/1998 | Ball | |
| 5,838,437 A | | 11/1998 | Miller | |
| 5,841,920 A | | 11/1998 | Lemaire | |
| 5,878,065 A | | 3/1999 | Delavaux | |
| 5,887,099 A | | 3/1999 | Csipkes et al. | |
| 5,892,582 A | | 4/1999 | Bao | |
| 5,896,193 A | | 4/1999 | Colbourne | |
| 5,914,978 A | | 6/1999 | Welch | |
| 5,946,438 A | | 8/1999 | Minot | |
| 5,959,753 A | | 9/1999 | Duling | |
| H001813 H | | 11/1999 | Kersey | |
| 5,978,539 A | | 11/1999 | Davies | |
| 5,991,483 A | | 11/1999 | Engelberth | |
| 5,999,671 A | | 12/1999 | Jin | |
| 6,044,189 A | | 3/2000 | Miller | |
| 6,097,530 A | | 8/2000 | Asher et al. | |
| 6,113,469 A | | 9/2000 | Yoshikawa et al. | |
| 6,115,122 A | | 9/2000 | Bao | |
| 6,137,812 A | | 10/2000 | Hsu | |
| 6,160,627 A | | 12/2000 | Ahn | |
| 6,163,553 A | | 12/2000 | Pfeiffer | |
| 6,168,319 B1 | * | 1/2001 | Francis | 385/79 |
| 6,181,851 B1 | | 1/2001 | Pan | |
| 6,229,827 B1 | | 5/2001 | Fernald | |
| 6,240,220 B1 | | 5/2001 | Pan | |
| 6,241,397 B1 | | 6/2001 | Bao et al. | |
| 6,263,002 B1 | | 7/2001 | Hsu | |
| 6,327,036 B1 | | 12/2001 | Bao | |
| 6,343,166 B1 | * | 1/2002 | Hellman et al. | 385/31 |
| 6,445,838 B1 | | 9/2002 | Caracci et al. | |
| 6,449,047 B1 | | 9/2002 | Bao | |
| 6,504,616 B1 | | 1/2003 | Haber | |
| 6,529,661 B1 | | 3/2003 | Kropp | |
| 6,671,432 B1 | | 12/2003 | Imada et al. | |
| 6,712,522 B1 | * | 3/2004 | Watanabe et al. | 385/60 |
| 6,767,139 B1 | * | 7/2004 | Brun et al. | 385/84 |
| 6,768,825 B1 | * | 7/2004 | Maron et al. | 385/13 |
| 6,769,817 B1 | * | 8/2004 | Saito et al. | 385/90 |
| 6,799,898 B1 | * | 10/2004 | Cheng et al. | 385/56 |
| 2003/0076505 A1 | | 4/2003 | Bao | |

FOREIGN PATENT DOCUMENTS

| | | |
|---|---|---|
| EP | 0 457 484 A2 | 11/1991 |
| EP | 0 721 121 A1 | 7/1996 |
| EP | 0 903 615 A2 | 3/1999 |
| EP | 1 016 884 A2 | 7/2000 |
| WO | WO 98/17968 | 4/1998 |
| WO | WO 98/27446 | 6/1998 |
| WO | WO 99/34484 | 7/1999 |
| WO | WO 00/07047 | 2/2000 |
| WO | WO 00/28355 | 5/2000 |
| WO | WO 00/39617 | 7/2000 |
| WO | WO 04/036700 | 4/2004 |

OTHER PUBLICATIONS

Arya, V. et al. (1997) "Application of Thin-Film Optical Filters to the Temperature Compensation of Optical Fiber Grating-Based Devices," IEEE Trans Instrum. Measurement 46(5):1173-1177.

Ball, G.A. et al. (Dec. 1994) "Compression-tuned single-frequency Bragg grating fiber laser," Optics Letters 19(23):1979-1981.

Barnes et al. (Sep. 1989) "High-quantum-efficiency $Er^{3+}$ fiber lasers pumped at 980 nm," Optics Letters 14(18):1002-1004.

Barnes et al. (1989) "Q-switching in fibre lasers," *Fiber Laser Sources and Amplifiers Proc. SPIE* 1171:302-308.

Bellemare et al. (Feb. 1999) "Multifrequency Erbium-Doped Fiber Ring Lasers Anchored on the ITU Frequency Grid," *Optical Fiber Communications (OFC/IOOC '99)* Feb. 21-26, 1999, San Diego, CA 1:16-18.

Bird et al. (1991) "Narrow line semiconductor laser using fibre grating," Electron Lett. 27:1115-1116.

Boucher, R. et al. (1992) "Calibrated Fabry-Perot etalon as an absolute frequency reference for OFDM communications," IEEE Photonics Technol. Lett. 4:801-803.

Davis, M. A. et al (1995) "Matched-filter interrogation technique for fibre Bragg grating arrays," Electron. Lett. 31(10:822-823.

David, M.A. et al. (1994) "All-fibre Bragg grating strain-sensor demodulation technique using a wavelength division coupler," Electron. Lett. 30(1):75-77.

Dunphy, J. et al. (1993) "Instrumentation development in support of fiber grating sensor arrays," Proc. SPIE V. 2071, pp. 2-11.

Farries, M.C. et al. (1998) "Hybrid DWDM devices utilizing dielectric filters and fiber Bragg gratings," OFC '98 Optical Fiber Communication Conf. and Exhibit, Technical Digest Series, vol. 2, Feb. 22-27, 1998, San Jose, CA, pp. 234-235.

Foote, P.D. (1994) "Fibre Bragg Grating Stain Sensors for Aerospace Smart Structures," Second European Conf. on Smart Structures and Materials, Glasgow, U.K., session 8, p. 290-293.

Friebele, E.J. et al. (1994) "Fiberoptic Sensors measure up for smart structures," Laser Focus World , (May) pp. 165-169.

Gamache et al. (Feb. 1996) "An Optical Frequency Scale in Exact Multiples of 100 GHz for Standardization of Multifrequency Communications," *IEEE Photon. Technol. Lett.* 8(2):290-292.

Gehrsitz, S. et al. (Aug. 1997) "Tandem Triple-Pass Fabry-Perot Interferometer for Applications in the Near Infrared," Appl. Opt. (36):5355-5361.

Giles et al. (Aug. 1994) "Reflection-induced changes in the optical spectra of 980 nm QW lasers," IEEE Photonics Technology Lett 6(8):903-906.

Giles et al. (Aug. 1994) "Simultaneous wavelength-stabilization of 980 nm pump lasers," IEEE Photonics Technology Lett. 6(8):907-909.

Glance, B.S. et al. (1988) "Densely spaced FDM coherent star network with optical signals confined to equally spaced frequencies," IEEE J. Lightwave Technol. LT-6:1770-1781.

Hammon, T.E. et al. (1996) "Optical fibre Bragg grating temperature sensor measurements in an electrical power transformer using a temperature compensated optical fibre Bragg grating as a reference," Eleventh Int'l . Conf. on Optical Fiber Sensors—Advanced Sensing Photonics, Part vol. 1, pp. 566-569 (Abstract Only).

Henriksson, A. et al. (1996) "Temperature insensitivity of a fiber optic Bragg grating sensor," Proc. SPIE 2839:20-33.

Hill et al. (Aug. 1997) "Fiber Bragg grating technology fundamentals and overview," J. Lightwave Technology 15(8):1263-1276.

Hsu, K. et al. (Jun. 1994) "Single-mode tunable erbium:ytterbium fiber Fabry-Perot microlaser," Optics Letters 19(12):886-888.

Hsu, K. et al. (Feb. 1995) "Continuous and discrete wavelength tuning in Er:Yb fiber Fabry-Perot lasers, "Optics Letters 20(4):377-379.

Humblet, P.A. et al. (Aug. 1990) "Crosstalk Analysis and Filter Optimization of Single-and Double-Cavity Fabry-Perot Filters," IEEE J. on Selected Areas in Communications 8(6):1095-1107.

Iocco et al. (Sep. 1998) "Tension and compression tuned Bragg grating filter," Proc. ECOC '98, vol. I:229-230.

Iocco et al. (Jul. 1999) "Bragg grating fast tunable filter for wavelength division multiplexing," J. Lightwave Technology 17(7):1217-1221.

Iwashima, T. et al. (1997) "Temperature compensation technique for fibre Bragg gratings using liquid crystalline polymer tubes," Electron. Lett. 33(5):417-419.

Ja, Y.H. (Sep. 1995) "Optical Vernier Filter with Fiber Grating Fabry-Perot Resonators," Appl. Opt. 34(27):6164-6167.

Jackson, D. A. et al. (1993) "Simple multiplexing scheme for a fiber-optic grating sensor network," Opt. Lett. 18(14):1192-1194.

Jackson, D. A. et al. (1982) "Pseudoheterodyne detection scheme for optical interferometers," Electron. Lett. 18(25):1081-1083.

Kaminow, I.P. et al. (1989) "A Tunable Vernier Fiber Fabry-Perot Filter for FDM Demultiplexing and Detection," IEEE Photonics Technol. Lett. 1(1):24-26.

Kersey, A. D. et al. (1992) "High-resolution fibre-grating based strain sensor with interferometric wavelength-shift detection," Electron. Lett. 28(3):236-238.

Kersey, A.D. (1993) "Fiber-optic Bragg grating strain sensor with drift-compensated high-resolution interferometric wavelength-shift detection," Opt. Lett. 18(1):72-74.

Kersey, A.D. et al. (1993) "Multiplexed fiber Bragg grating strain-sensor system with a fiber Fabry-Perot wavelength filter," Opt. Lett. 18:1370-1372.

Kersey, A.D. et al. (1995) "Development of Fiber Sensors for Structural Monitoring," SPIE 2456:262-268.

Kersey, A.D. (1996) "Interrogation and Multiplexing Techniques for Fiber Bragg Grating Strain-Sensors," Optical Sciences Division, Naval Research Laboratory (NRL) code 5674, distributed by NRL at SPIE Meeting, Fall 1996, (Denver, CO).

Krüger et al. (Apr. 1997) "Quasicontinuous Tunable Fiber-Ring Laser Applied as Local Oscillator in an Absolute Calibrated Spectrometer for WDM Systems," *J. Lightwave Technol.* 15:628-635.

Liu, Y. et al. (1997) "Temperature insensitive fiber grating," Chinese J. of Lasers 24(10):895-898 (Abstract Only).

Lindsay, S.M. et al. (1981) "Construction and Alignment of a High Performance Multipass Vernier Tandem Fabry-Perot Interferometer," Rev. Sci. Instrum. 52(10):1478-1486.

Lemieux, J-F, et al, (May 1999) "Step-tunable (100GHz) Hybrid Laser Based on Vernier Effect Between Fabry-Perot Cavity and Sampled Fibre Bragg Grating," Electron. Lett. 35(11):904-906.

Lemieux, J-F. et al. (Jul. 1999) "100 Ghz Frequency Step-Tunable Hybrid Laser Based on a Vernier Effect Between Fabry-Perot Cavity and Sampled Fibre Bragg Grating." OSA Trends in Optics and Photonics. Advanced Semiconductor Lasers and Their Applications, vol. 31, from the Topical Meeting Editor(s): Hollberg, L. and Lang, R.J., Optical Soc. America, Washington, DC, USA, pp. 186-188.

Liou et al. (Dec. 1998) "A 24-Channel Wavelength-Selectable Er-Fiber Ring Laser with Intracavity Waveguide-Grating-Router and Semiconductor Fabry-Perot Filter," *IEEE Photon. Technol. Lett.* 10(12):1787-1789.

Martin, J. et al. (1997) "Use of a sampled Bragg grating as an in-fiber optical resonator for the realization of a referencing optical frequency scale for WDM communications," Optical Fiber Communication Conference OFC-97, Technical Digest, paper Th15, pp. 284-285.

Melle, S. M. et al. (1993) "A Bragg grating-tuned fiber laser strain sensor system," IEEE Photon. Technol. Lett. 5(2):263-266.

Miller, C. M. et al. (May 13-15, 1991) "Characteristics and applications of high performance, tunable, fiber fabry-perot filters," 41$^{th}$ Electronics Components & Technology Conference, Atlanta, Georgia, 4 pp.

Miller, C.M. et al. (1992) "Wavelength-Locked, Two-Stage Fibre Fabry-Perot Filter for Dense Wavelength Division Demultiplexing in Erbium-Doped Fibre Amplifier Spectrum," Electron. Lett. 28(3):216-217.

Moore, J. H. et al. *Building Scientific Apparatus*, Second Edition, Addison-Wesley Publishing Company, Reading, Massachusetts, pp. 242-251, 1989.

Nyman, B. (Sep. 1998) "Four Measurement Methods Chracterize WDM Components," Optoelectronics World, 527-532.

Olsson et al. (Feb. 1985) "Chirp-free transmission over 82.5 km of sigle mode fibers at 2 Gbit/s with injection locked DFB semiconductor lasers," J. Lightwave Technology LT-3(1):63-66.

Oretga, B. et al. (Jul. 1999) "Wavelength Division Multiplexing All-Fiber Hybrid Devices Based on Fabry-Perot's and Gratings," J. Lightwave Technol. 17(7):1242-1247.

Park et al. (Nov. 1991) *"All Fiber, low threshold, widely tunable single-frequency, erbium-doped fiber ring laser with a tandem fiber Fabry-Perot filter,"* Appl. Phys. Lett. 59:2369-2371.

Park et al. (Jun. 1993) *"Frequency locking of an erbium-doped fiber ring laser to an external fiber Fabry-Perot resonator,"* Optics Lett. 18(11):879-881.

Poulsen, C.V. et al. (Jun. 1993) "Highly Optimized Tunable Er$^{3+}$-Doped Single Longitundinal Mode Fiber Ring Laser, Experiment and Model," IEEE Photonics Technol. Lett. 5:646-648.

Rao, Y-J. et al. (1995) "Spatially-multiplexed fibre-optic Bragg grating stain and temperature sensor system based on interferometric wavelength-shift detection," Electron. Lett. 31(12):1009-1010.

Rao, Y-J. et al. (1996) "Universal Fiber-Optic Point Sensor System for Quasi-Static Absolute Measurements of Multiparameters Exploiting Low Coherence Interrogation," J. Lightwave Technol. 14(4):592-600.

Rao, Y-J. (1960) "Strain sensing of modern composite materials with a spatial-wavelength-division multiplexed fiber grating network," Opt. Lett. 21(9):683-685.

Sakai, T. et al. (1992) "Frequency stabilization of laser diodes using 1.51-1.55 µm absorption lines of $^{12}C_2H_2$ and $^{13}C_2H_2$," IEEE J. Quant. Electron. 28:75-81.

Stone, J. et al. (1986) "Ultrahigh finesse fiber Fabry-Perot interferometers," IEEE J. Lightwave Technol. LT-4:382-385.

Stone, J. et al. (1987) "Pigtailed high-finesse tunable fibre Fabry-Perot interferometers with large, medium and small free spectral ranges," Elect. Lett. 23(15):781-783.

Weis, R. S et al. (1994) "A four-element fiber grating sensor array with phase-sensitive detection," IEEE Photon. Technol. Lett. 6(12):1469-1472.

Wyatt et al. (1982) "Megahertz linewidth from a 1.5 µm semiconductor laser with HeNe laser injection," Electron. Lett. 18:292-293.

Xu, M.-G. et al. (1993) "Novel frequency-agile interrogating system for fibre Bragg grating sensor," Proc. SPIE V. 2071, pp. 59-65.

Yamashita et al. (Aug. 1997) "Miniature ebrium:ytterbium fiber Fabry-Perot multiwavelength lasers," IEEE J. Selected Topics in Quantum Electronics 3(4):1058-1064.

Yamashita, S. et al. (Sep. 1998) "Single-polarization operation of injection locked fiber DFB lasers," CTuF6 European Conference on Lasers and Electro-Optics '98, Glasgow, Scotland, Sep. 13-18, 1998.

Yamashita, S. et al. (Mar. 1999) "Single-polarization operation of fiber distributed feedback (DFB) lasers by injeciton locking," J. Lightwave Technology 17(3):509-513.

Yoffe, G.W. et al. (1995) "Passive temperature-compensating package for optical fiber gratings" Applied Optics 34(30):6859-6861.

Yoffe, G.W. et al. (1995) "Temperature-compensated optical-fiber Bragg gratings" OFC '95 Technical Digest, W14-pp. 134-135.

Yoffe, G.W. et al. (1994) "Temperature-Compensating Mounts for Optical Fibre Biagg Gratings" ACOFT '94, pp. 262-265.

Yun et al. (Jun. 1998) "Interrogation of Fiber Grating Sensor Arrays with a Wavelength-swepth Fiber Laser," Optics Letters 23(11):843-845.

Zervas, M.N. et al. (1989) "Optical-fibre surface-plasmon-wave polarisers with enhanced performance," Electron. Lett. 25:321-323.

Zhang et al. (Jan. 1996) *"Stable Single-Mode Compound-Ring Erbium-Doped Fiber Laser,"* IEEE J. Lightwave Technol. 14 (1):104-109.

International Searching Authority (May 4, 2004) International Search Report for International Application No. PCT/US03/41822, 7 pp.

International Searching Authority (Jun. 17, 2004) International Search Report for International Application No. PCT/US03/32929, WO 04/036700 A2, 6 pp.

\* cited by examiner

Expanded view of fastening element shown as optional tapped holes for receiving screws.

Cross-section view of bore (optionally generally cylindrical with three substantially flat surfaces)

Cross-section view of bore (optionally triangular)

SELECTABLE AND TUNABLE FERRULE HOLDER FOR A FIBER FABRY-PEROT FILTER

CROSS-REFERENCE TO RELATED APPLICATIONS

This application claims priority under 35 U.S.C. 119(e) to provisional patent application 60/435,425, filed Dec. 20, 2002, which is hereby incorporated by reference in its entirety to the extent not inconsistent with the disclosure herein.

BACKGROUND OF INVENTION

As worldwide telecommunications usage continues to expand, the need for more efficient and accurate means of processing and transporting data has become apparent. To satisfy the ever-increasing demand for greater bandwidth, research efforts over the last several decades have been directed toward developing optical signaling methodologies providing improved efficiency, increased accuracy and greater signal capacity. As a result of the incorporation of optical components into conventional telecommunication systems, substantial gains in channeling capacity, signal accuracy and transport efficiency have been realized.

For example, transmission of information by the propagation of optical signals in optical fibers is now widely used to increase the signaling rates in long haul-haul telecommunication systems. In these systems, optical signals are generated from electronic signals, transported along great distances via optical fibers and detected in a manner to regenerate the original electronic signal. Use of optical fiber for signal transmission is capable of achieving very high signal transmission rates ranging from several mega-bits per second to several tens of giga-bits per second. In addition, use of optical means for signal transmission has been shown to provide decreased propagation loss, higher channeling capacity and resistance to electromagnetic interference. As a result of these well-known advantages, optical communication components are pervasive in nearly all modern telecommunication networks.

To realize the full benefits provided by optical signal transmission and processing, substantial research has been directed toward the goal of developing purely optical telecommunication systems. In a purely optical telecommunication system, all aspects of signal generation, transmission, and processing are performed by optical methods and devices. While significant improvements in signal generation and transmission have been realized using optical methods, signal processing by purely optical methods remains a primary barrier to achieving the full benefits of optical telecommunications. To achieve the maximum efficiency and accuracy gains afforded by purely optical telecommunication systems, methods of direct optical processing without conversion to electronic signals are needed.

Research directed toward developing purely optical telecommunication systems has focused on a variety of optical signal processing applications that avoid the conversion of optical signals to electronic signals. Such applications require optical devices capable of performing the full spectrum of signal processing functions, such as filtering, amplification, beam splitting, switching, signal equalizing, signal coupling, wavelength multiplexing and wavelength demultiplexing. Low loss Fabry-Perot (FP) optical filters and interferometers, particularly fiber Fabry-Perot filters and interferometers, are important optical components in a great number of such optical devices.

A Fabry-Perot interferometer (FPI) consists of an optical resonance cavity formed between two reflectors, commonly substantially parallel reflectors. Typically, the reflector pair comprise partially transmitting, low loss reflectors. The optical path length through the resonance cavity may be selectably adjustable, thereby providing an interferometer having tunable transmission properties. Alternatively, the optical path length through the resonance cavity may be fixed, thereby providing an interferometer having fixed transmission properties. The basic structure and operation of an FP interferometer is well-known in the art and is described by Moore et al. in "Building Scientific Apparatus", Addison-Wesley Publishing Co, 1989, pgs. 242–251.

FP interferometers pass narrow bands of light, the transmission bands of the filter, having center wavelengths, which satisfy the resonance condition of the interferometer. Specifically, when the optical path length of the round-trip length of the cavity is an integer of a wavelength, then that wavelength together with a narrow band resonates inside the cavity, and passes through the filter with very low losses. For a fixed FP cavity length, the resonant wavelength changes periodically. The period of the resonant wavelength is called free spectral range (FSR) of the filter and is provided by the equation:

$$FSR = \frac{c}{2L} \tag{I}$$

where c is the speed of light and L is the optical thickness of the resonance cavity. In a tunable FP etalon, the FSR and the resonant wavelengths are selectably adjustable by changing the optical path length through the resonance cavity.

Three types of FP tunable filters are typically used in fiber-optic communication systems: (1) lensed FP interferometers, (2) microelectromechanical system based FP filter (MEMS-FP filter), and (3) all-fiber FP interferometer. All-fiber FP interferometers are preferred for many telecommunications applications due to their exceptional stability, low cost and high optical throughput. The fabrication and use of fixed frequency and tunable FFP filters are described in U.S. patents including U.S. Pat. Nos. 5,892,582; 6,115,122; 6,327,036; 6,449,047; 6,137,812; 5,425,039; 5,838,437; and U.S. patent application Ser. Nos. 09/633,362; 09/505,083; 09/669,488, which are hereby incorporated by reference to the extent that they are not inconsistent with the disclosure in this application FIG. 1 illustrates a typical fiber Fabry-Perot tunable filter (FFP-TF) formed in a ferrule assembly consisting of two reflectors 10 and 12 deposited directly onto fiber ends 9 and 11, respectively and a single-mode fiber (SMF) waveguide 20, (5 μm to 10 mm in length, held within a ferrule wafer) of selected length bonded to one mirror 10 (the embedded mirror). The internal end of the wafer 13 and the mirror-ended fiber end 11 are spaced apart to form an air-gap 21 within the cavity, the length of which can be selectively adjusted to tune the transmission properties filter. The FFP configuration of FIG. 1 (not drawn to scale) is illustrated as a fiber ferrule assembly in which fibers 5 and 7 each having a fiber core 22 and fiber cladding 23 are fixed within the axial bores of ferrules 1 and 3. Ferrule 1 illustrates a wafered ferrule which is formed by aligning and bonding the ends of two ferrule confined fibers and cutting one to the desired wafer length to give the wafer 20 bonded to the ferrule 1.

The entire optical configuration is aligned within a fixture or holder, which maintains fiber alignment and allows the cavity length to be tuned without significant loss of alignment. For example, the holder can be provided with a piezoelectric transducer (PZT) actuator to allow the optical path length of the resonance cavity to be changed. This optical configuration provides for wavelength tuning and control with positioning accuracy of atomic dimensions.

FIG. 2 provides a schematic illustration of a conventional alignment and tuning fixture 40 for fiber FFP filters. Ferrules 1 and 3 (containing fibers 5 and 7, respectively) are held within ferrule holders 35 and 37 of fixture 40 with internal ends aligned and spaced apart to form an air gap. Ferrule holders 35 and 37 into which the ferrules are inserted and held in alignment are attached on opposing sides of a PZT element 36 which changes its length (along axis 25) upon application of a voltage. The PZT element 36 has an axial bore into which the ferrules extend and within which the FFP cavity is formed. Fixed frequency Fiber Fabry-Perot filters in which the cavity length is fixed at a selected length have also been described.

In contrast to lensed and microelectromechanical Fabry-Perot interferometers, FFP filters are generally robust and compatible with a wide range of field settings. To provide high throughput optical filtering, however, the optical fibers and ferrules comprising a FFP must be radially aligned to very high precision and accuracy and must be capable of maintaining good radial alignment during tuning. In addition, to achieve accurate optical filtering with minimized wavelength drift the optical fibers and ferrules comprising a FFP must be capable of maintaining a selected optical path length through the FFP resonance cavity. Accordingly, most ferrule fixtures and FFP assemblies include radial and longitudinal alignment systems to achieve and maintain good alignment. Examples of fixed and tunable FFP filters and holders for alignment and tuning are provided in U.S. Pat. Nos. 5,212,745; 5,212,746; 5,289,552; 5,375,181; 5,422,970; 5,509,093; 5,563,973; 6,241,397; and U.S. patent application Ser. No. 10/233,011, which are hereby incorporated by reference in their entireties to the extent that they are not inconsistent with the disclosure in this application.

Although conventional alignment fixtures have been shown to provide the precise and good alignment necessary for high optical performance, incorporation of these alignment systems in some applications has certain disadvantages. First, inclusion of elaborate alignment schemes often adds to the overall complexity of FFP filters, thereby, increasing the difficulty and cost of their fabrication. Second, many radial alignment systems are incapable maintaining good radial alignment while at the same time providing a selectably adjustable optical path length through the FFP resonance cavity. Therefore, these alignment systems are incompatible with tunable FFP filters. Other alignment schemes, while capable of providing tunable FFP filters, are susceptible to substantial deviations in alignment during adjustment of resonance cavity optical path length and, therefore, require periodic realignment. Finally, some radial and longitudinal alignment schemes are difficult, if not impossible, to effectively temperature compensate. Therefore, FFP filters employing these alignment schemes are susceptible to significant wavelength drift over a range of temperatures.

The present invention provides low loss FFP filters capable of maintaining good optical alignment and exhibiting high temperature stability temperature compensation. Particularly, the present invention provides a unitary fiber ferrule holder capable of achieving and maintaining the alignment of two optical fibers comprising a fixed frequency and tunable FFP. In addition, the present invention provides temperature compensated—FFP filters capable of maintaining good radial alignment and longitudinal alignment over a wide range of temperatures. Further, low cost instruments for mechanical sensing applications, such as monitoring temperature, pressure, and displacement, employing FFP filters with good radial and longitudinal alignment are presented.

SUMMARY OF THE INVENTION

It is an object of the present invention to provide fixed-frequency and tunable FFP filters providing good radial and longitudinal alignment of optical fibers and ferrules. It is also an object of this invention to provide FFP filters capable of maintaining good radial and longitudinal alignment for varied operating conditions, long operating times and for a range of optical path lengths through the resonance cavity. In furtherance of these objectives, this invention provides methods, devices, and device components for improving the alignment, stability and temperature compensation of tunable—FFP filters and fixed frequency—FFP filters. In one aspect, the invention relates to fiber ferrule holders providing good radial and longitudinal alignment of fibers and ferrules, which provide FFP filters having decreased optical loss, particularly decreased insertion loss. Preferred fiber ferrule holders are capable of substantially constraining the motion of a pair of ferrules in all directions except a direction parallel to the longitudinal axis, thereby, allowing the optical path length resonance cavity of a FFP filter to be selectable adjusted while maintaining good radial alignment. In one aspect, the present invention provides a means of securing two ferrules within a FFP filter and maintaining good radial alignment while allowing longitudinal variation of the optical path length of the resonance cavity such that the transmission properties of the filter can be tuned, particularly the free spectral range and the resonance frequencies.

It is also an object of the present invention to provide temperature compensated ferrule holders and FFP filters that are stable with respect to wavelength drift over a useful range of device operating temperatures, such as a temperature range of about −20° C. to about 85° C. In furtherance of this object, improved methods for adjusting the coefficients of thermal expansion of fiber ferrule holders and FFP filters are presented, which provide FFP filters with selectably adjustable transmission properties over a wide range of temperatures. In the filters of the present invention, the coefficients of thermal expansion of the fiber ferrule holders and FFP filters can be selectively adjusted after fabrication of the filter in order to minimize variation of the optical path length through the resonance cavity over a useful range of temperatures. Preferred filters exhibit a wavelength drift of less than about 1 FSR/100° C. Also provided are ferrule holders and temperature compensated FFP filters that are easily and reproducibly constructed to satisfy desired optical transmission properties and maintain good temperature stability.

Another object of the present invention is to provide FFP filters capable of functioning as sensitive monitors of ambient conditions, physical conditions and mechanical phenomena. In preferred embodiments, FFP filters capable of functioning as measuring devices further comprise an actuator capable of varying the optical path length through the resonance cavity as a function of the physical property, ambient condition or mechanical phenomena being monitored. FFP filters are provided for monitoring a variety of physical properties, particularly temperature, force and pressure. In addition, FFP filters comprising highly sensitive displacement transducers and accelerometers are also provided.

In another aspect, the present invention comprises a holder for spatially aligning two objects. An exemplary holder of the present invention comprises a unitary body having an axial bore extending along a longitudinal axis, a first fastening element for securing the first object into the unitary body and a second fastening element for securing the second object into the unitary body. The axial bore of the unitary body has a first end for receiving the first object and a second end for receiving the second object. In a preferred embodiment, at least a portion of the unitary body is elastic with respect to expansion, compression or both along the longitudinal axis. In a preferred embodiment the elasticity of the unitary body allows for selective variation of the distance between the first end and the second end of said unitary body along the longitudinal axis. In a more preferred embodiment, the elasticity of the unitary body allows selective adjustment of the distance separating the first and second objects along the longitudinal axis. In an exemplary embodiment, the elasticity of the unitary body is symmetric about the longitudinal axis. In another exemplary embodiment, the unitary body substantially constrains the motion of the first and second objects in all directions except in a direction parallel to the longitudinal axis. In an embodiment preferred for some applications, the holder of the present invention further comprises an actuator capable of selectively adjusting the separation between the first and second objects along the longitudinal axis.

In a preferred embodiment, the holder of the present invention comprises a ferrule holder for a fiber filter, which is capable of providing good radial and longitudinal alignment of ferrules and the optical fibers therein. An exemplary ferrule holder comprises a unitary body, a first ferrule fastening element for securing a first ferrule in the unitary body and a second ferrule fastening element for securing a second ferrule in the unitary body. The unitary body has an axial bore extending along a longitudinal axis and has a first end for receiving the first ferrule and a second end for receiving the second ferrule. The first ferrule and the second ferrule each have an internal face and an external face, which are oriented transverse to the longitudinal axis of the axial bore. First and second ferrules are oriented such that their internal faces oppose each other. In a preferred embodiment, at least a portion of the unitary body is elastic with respect to expansion, compression or both along the longitudinal axis, thereby allowing for variation of the distance between the internal faces of the first and second ferrules. In this embodiment, the ferrules are secured in the ferrule holder such that the optical resonance cavity of a FFP filter can be varied without significant loss of radial alignment. In a preferred embodiment, the elasticity of the unitary body allows for movement of the first ferrule in a direction substantially parallel to the longitudinal axis. In an alternative preferred embodiment, the elasticity of the unitary body allows for movement of the second ferrule in a direction substantially parallel to the longitudinal axis. In another alternative preferred embodiment, the elasticity of the unitary body allows for movement of both the first and second ferrules in directions substantially parallel to the longitudinal axis. Embodiments of the ferrule holder of present invention allowing for variation of the distance between the internal faces of the first and second ferrule are beneficial because they provide tunable FFP filters wherein the optical path length through the resonance cavity is adjustable, preferably selectively adjustable.

In a preferred ferrule holder of the present invention, the elasticity of the unitary body is symmetrical about the longitudinal axis such that longitudinal motion of the first ferrule, second ferrule or both does not induce motion of the first ferrule, second ferrule or both in directions other than motion along the longitudinal axis. In another preferred embodiment, the unitary body substantially constrains movement of the first and second ferrules in all directions other than a direction parallel to the longitudinal axis. Embodiments of the ferrule holder of the present invention wherein the unitary body substantially constrains movement of the first and second ferrules in all directions other than a direction parallel to the longitudinal axis are beneficial because they provide FFP filters that are easily optically aligned and are capable of maintaining good radial alignment over a range of optical path lengths through the resonance cavity and over a wide range of operating conditions.

Ferrule holders of the present invention comprise unitary bodies having an axial bore for receiving at least two ferrules. Use of a unitary body is beneficial because both ferrules are held within a continuous axial bore and, therefore, are easy to precisely and accurately optically align and are capable of maintaining good optical alignment over a range of operating conditions, particularly a range of optical path lengths through the resonance cavity. Preferred ferrule holders of the present invention comprise a flexible unitary body, at least a portion of which is elastic with respect to compression or expansion along the longitudinal axis. Use of a unitary body having at least some elasticity is beneficial because it allows for device constructions wherein two or more ferrules are able to translate in directions substantially parallel to the longitudinal axis. Ferrule holders capable of allowing movement of two or more ferrules in a direction along the longitudinal axis are useful for tunable FFP filters and devices for measuring ambient conditions, physical properties and mechanical phenomena because they allow filter constructions having a variable optical path length of light through the resonance cavity.

In an exemplary ferrule holder of the present invention, the elasticity of the unitary body is provided by a system of channels created in the unitary body, preferably channels oriented perpendicular to the longitudinal axis. The channel system of the unitary body may create one or more springs in the unitary body. Exemplary spring configurations include, but are not limited to, non-folded beam springs and folded beam springs. Preferred ferrule holders have unitary bodies made of materials exhibiting at least some elasticity, such as stainless steel alloys, Invar and Kovar.

In a preferred embodiment, the ferrule holder of the present invention is radially temperature compensated to minimize temperature induced variation of the positions of the first and second ferrules in all direction other than the along longitudinal axis. In a preferred embodiment, the ferrule holder is temperature compensated by substantially matching the coefficient of thermal expansion of the material comprising the unitary body to the coefficient of thermal expansion of the material comprising the ferrule. In an exemplary embodiment, the unitary body is fabricated from a metal alloy, such as stainless steel, having a coefficient of thermal expansion almost identical to that of a ceramic ferrule. In an alternate preferred embodiment, the unitary body is fabricated from a low expansion electronic alloy, such as Invar and Kovar, having a coefficient of thermal expansion almost identical to that of a glass, Pyrex or quartz ferrule. Selection of unitary body and ferrule materials having similar coefficient of thermal expansion is beneficial because the forces exerted on the ferrule by the ferrule holder remain nearly constant when the ferrule holder is subject to temperature cycling. In another preferred embodiment, the coefficient of thermal expansion of the ferrule holder is selectively adjustable, for example by adjusting the ferrule fastening elements.

In another embodiment, the ferrule holder of the present invention also comprises an actuator operationally coupled to the unitary body for adjusting the distance between the internal ends of the first and second ferrules along the longitudinal axis. Preferred actuators of the present invention have an internal end and an external end and are oriented such that the internal end, external end or both is operationally coupled to the unitary body. Preferred actuators are capable of generating a force substantially parallel to the longitudinal axis. Ferrule holders having actuators provide tunable FFP filters and devices for measuring physical properties and mechanical phenomena. Actuators of the present invention preferred for tunable FFP filters are capable of supplying a force to the unitary body such that the distance between the internal ends of the first and second ferrules along the longitudinal axis is selectively adjustable. Actuators of the present invention preferred for use in FFP measuring devices are capable of providing a force to the unitary body having a magnitude that varies systematically with a selected ambient condition, physical property or mechanical phenomena. In an exemplary embodiment, the actuator generates a force such that the unitary body contracts along the longitudinal axis, thereby decreasing the distance between the internal ends of the first and second ferrules along the longitudinal axis. In an alternative exemplary embodiment, the actuator generates a force such that the unitary body expands along the longitudinal axis, thereby increasing the distance between the internal ends of the first and second ferrules along the longitudinal axis. Ferrule holders of the present invention may further comprise a plurality of actuators operationally coupled to the unitary body. In an exemplary embodiment, a first actuator is operationally coupled to the first end of the unitary body and a second actuator is operationally coupled to the second end of the unitary body. In an alternative embodiment, a single actuator is operationally coupled to the first end and the second end of the unitary body.

Exemplary ferrule holders of the present invention may further comprise a mounting strap or retainer for operationally coupling the actuator to the unitary body. In a preferred exemplary embodiment, a mounting strap of the present invention functions to fix the position of the external end of the actuator to ensure the force generated by the actuator is directed toward the unitary body and is parallel to the longitudinal axis. Mounting straps, actuators or both may also be configured to provide longitudinal temperature compensation for minimizing unwanted wavelength drift during temperature cycling.

Actuators of the present invention may comprise any device capable of exerting a force upon the unitary body, preferably a force substantially parallel to the longitudinal axis. In an exemplary embodiment, the actuator comprises a piezoelectric transducer that exerts a force having a selectably adjustable magnitude on the unitary body. Upon application of an electric potential, the piezoelectric transducer expands or contracts in a direction parallel to the longitudinal axis. Expansion or contraction of the piezoelectric transducer changes the magnitude of the force exerted on the unitary body, thereby varying the distance between the internal faces of the first and second ferrules along the longitudinal axis. Preferred piezoelectric transducer actuators are capable of selectably adjusting the distance between the internal faces of the ferrules, which provides FFP filters having selectably adjustable optical path lengths through the resonance cavity. Piezoelectric transducer actuators of the present invention may be operationally coupled to the first end of the unitary body, the second end of the unitary body or to both first and second ends. Other actuators of the present invention include, but are not limited to, an electrostrictive material, an electro-optic modulator, a material having a coefficient of thermal expansion different than that of the material comprising the unitary body or a mechanical device capable of supplying a force to the unitary body, such as a spring, diaphragm or moveable object.

In another aspect, the present invention comprises a fixed frequency or tunable FFP filter capable of maintaining good radial and longitudinal alignment over a wide range of operating conditions. An exemplary fiber Fabry-Perot filter comprises a fiber ferrule assembly having an optical resonance cavity therein, a unitary body, a first ferrule fastening element for securing the first ferrule in the unitary body and a second ferrule fastening element for securing the second ferrule in the unitary body. The fiber ferrule assembly comprises a first and a second ferrule each of which has an azial bore along a longitudinal axis therethrough for receiving an optical fiber and a relector transverse to the axial bore. First and second ferrules each have internal faces oriented transverse to the longitudinal axis and are positioned with respect to each other such that the internal faces of the ferrules are opposed, thereby forming an optical resonance cavity between opposing reflectors. The unitary body has an axial bore also extending along a longitudinal axis, a first end for receiving the first ferrule and a second end for receiving the second ferrule. In a preferred embodiment, at least a portion of the unitary body is elastic with respect to expansion, compression or both along the longitudinal axis, thereby allowing for variation of the distance between the internal faces of the first and second ferrules. In a preferred embodiment, the elasticity of the unitary body allows for variation of the distance between the internal faces of the first and second ferrules, thereby also allowing a variation in the optical path length through the resonance cavity. Preferred embodiments comprise a ferrule holder capable of holding ferrules such that the optical path length of light through the resonance cavity can be varied without significant loss of alignment, preferably good or optimal alignment. FFP filters of the present invention may be longitudinally and radially temperature compensated such that their transmission properties, particularly free spectral range and resonance frequencies, do not vary substantially over a useful temperature range, such as −20° C. to 85° C.

FFP filters of the present invention may further comprise an actuator operationally coupled to the unitary body for varying the distance between the internal ends of the first and second ferrules along the longitudinal axis and, thereby, adjusting the optical path length through the resonance cavity. Preferred FFP filters are capable of maintaining good alignment of the fibers and ferrules over a wide range of resonance cavity optical path lengths and operating conditions. In an exemplary embodiment comprising a tunable FFP, the actuator provides a means of selectably adjusting the optical path length of light through the resonance cavity, thereby selectably adjusting the transmission properties of the filter, particularly selectably adjusting the free spectral range and resonance frequencies.

Ferrule holders of the present invention are also capable of providing tunable or fixed frequency optical filters having a plurality of optical resonance cavities. In a preferred embodiment, a ferrule holder of the present invention comprises one or more actuators capable of adjusting the optical path lengths through one or more optical resonance cavities in a multicavity optical filter.

In another aspect, FFP filters of the present invention comprise sensitive instruments for monitoring ambient conditions, physical properties and mechanical phenomena. In an exemplary embodiment comprising a device for monitoring a selected physical property, a FFP filter of the present invention has an actuator that exerts a force on the unitary body, the magnitude of which is dependent on the selected property, such as temperature, pressure or the physical displacement or motion of an object. The magnitude of the force generated by the actuator establishes the optical path length of light through the resonance cavity and, thereby, determines the transmission properties of the filter. Accordingly, by monitoring the change in the wavelengths of light transmitted by the FFP filter, a measurement of a selected physical property or mechanical phenomenon may be made.

In an alternative embodiment comprising a temperature transducer, a FFP filter of the present invention comprises a ferrule holder with an actuator comprising a material having a coefficient of thermal expansion different than that of the material comprising the unitary body. In this embodiment, expansion or contraction of the actuator due to changes in temperature provides a variation in the magnitude of the force exerted by the actuator on the unitary body. This change in force results in a change in the distance between the internal ends of the first and second ferrules along the longitudinal axis, thereby changing the optical path length through the resonance cavity. The change in free spectral range, resonance frequency or both caused by the variation in optical path length through the resonance cavity can be monitoring by measuring the change in the wavelength of light transmitted by the FFP filter, thereby providing a sensitive measurement of temperature.

In an alternative embodiment comprising a device for measuring pressure, a FFP filter of the present invention has a ferrule holder with an actuator comprising a diaphragm having a known force constant. The actuator is oriented such that the magnitude of the force exerted on the unitary body varies systematically with the displacement of the diaphragm. As the force on the unitary body varies, the optical path length of light through the resonance cavity changes, which in turn determines the optical characteristics of the FFP filter. This change in transmission properties can be monitoring by measuring the change in the wavelengths of light transmitted by the FFP filter, thereby providing a sensitive measurement of the displacement of the diaphragm. With knowledge of the force constant of the diaphragm, this embodiment of the present invention provides an indirect measurement of pressure. In an alternative embodiment providing a means of measuring force, the actuator of the present invention comprises a spring with a known force constant.

In another aspect, the present invention provides a displacement transducer providing extremely sensitive measurements of the physical displacement or motion of an object or body. In this embodiment, a FFP filter of the present invention is operationally coupled to an object in a manner such that movement of the object in a direction along the longitudinal axis results in a variation of the force exerted by the actuator onto the unitary body. In an alternative embodiment comprising an accelerometer, a weight is attached to one end of the ferrule holder to measure acceleration parallel to the longitudinal axis.

The invention is further illustrated by the following detailed description, examples, drawings and claims.

BRIEF DESCRIPTION OF THE DRAWINGS

FIG. 5A illustrates a folded beam spring having a single fold. FIG. 5B illustrates a folded beam spring having two folds. FIG. 5C illustrates a non-fold beam spring.

DETAILED DESCRIPTION OF THE INVENTION

Figure 1:
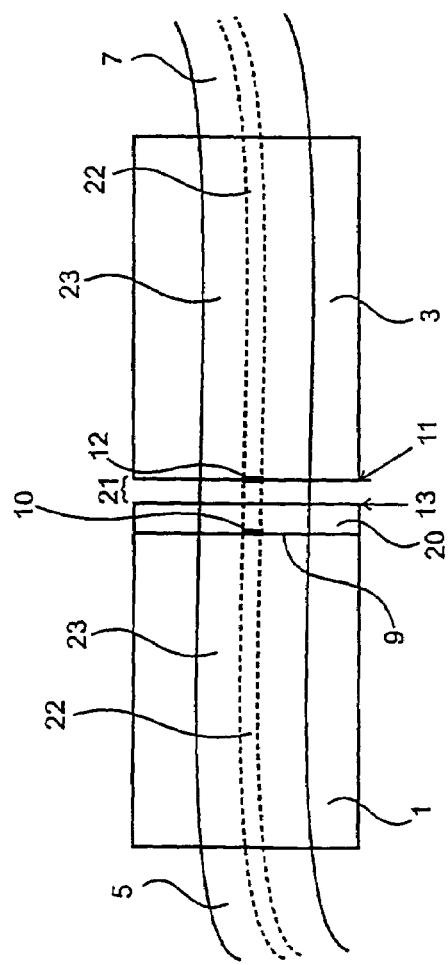
FIG. 1 is a schematic drawing illustrating a single wafered FFP filter.
Figure 2:
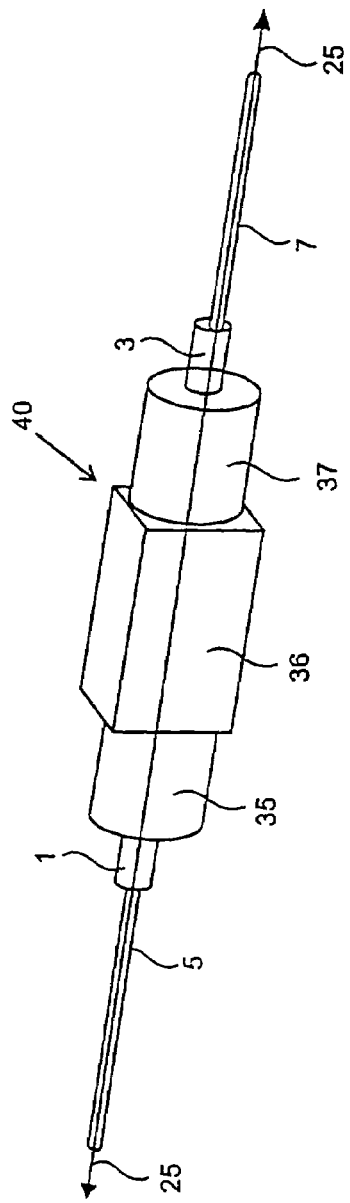
FIG. 2 is a schematic diagram illustrating a prior art ferrule holder alignment fixture that can be used to align and maintain the alignment of a FFP. The holder can be provided with a piezoelectric transducer to change the length of the FFP resonance cavity.

Referring to the drawings, like numerals indicate like elements and the same number appearing in more than one drawing refers to the same element. In addition, hereinafter, the following definitions apply:

"Elastic" refers to the capability of a material, object, device or device component to increase or decrease size with respect to one or more physical dimensions. Elastic materials may be extensible, compressible or both. Elasticity refers to a characteristic of a material, object, device or device component having elasticity. In the present invention, at least a portion of the exemplary unitary bodies in ferrule holders are elastic. Elasticity substantially symmetric about the longitudinal axis refers to an elasticity such that the force constant of an elastic body is approximately the same at any point of a plane that is oriented perpendicular to the longitudinal axis. Elasticity substantially symmetric about the longitudinal axis is preferred in some ferrule filters of the present invention because it minimizes parasitic motion of the internal faces of the ferrules along axes other than the longitudinal axis.

"Longitudinal axis" refers to the axis along which an optical fiber is positioned within a ferrule or ferrule holder.

"Alignment" refers to the axial alignment of optical fiber ends of two or more ferrules in a FFP filter or ferrule holder. Optimal alignment of ferrules in a FFP filter maximizes the transmission of light meeting the resonance condition of the optical cavity through the FFP filter. The term alignment also refers to optimizing the angular alignment of roll, pitch and yaw.

"Longitudinal alignment" refers to the distance along a longitudinal axis between two objects. Exemplary ferrule holders and FFP filters of the present invention provide good longitudinal alignment. In certain applications of the present invention, good longitudinal alignment refers to the ability of a ferrule holder to maintain a selected distance between the internal faces of two ferrules positioned along a longitudinal axis with deviations from the selected distance of less than about 50 picometers. Good longitudinal alignment also refers to the ability of a ferrule holder to selectably adjust the distance between internal faces of two or more ferrules positioned along a longitudinal axis with high accuracy and precision.

"Radial alignment" refers to the relative spatial orientation of ferrules and optical fibers in all dimensions other than the longitudinal axis. Exemplary ferrule holders and FFP filters of the present invention provide good radial alignment. In certain applications of the present invention, good radial alignment refers to an orientation of two ferrules, optical fibers or both with deviations from optimal alignment less than about 0.5 micron in one or more dimensions. FFP filters having good radial alignment provide high throughput, low losses optical filters. Use of a unitary body for holding ferrules improves the easy of optical fiber alignment in FFP filters and ensures that good alignment is maintained for a range of optical path length of light through the resonance cavity and for a range of operating conditions. Good radial alignment also refers to the ability of a ferrule holder to establish a selected relative orientation between internal faces of two or more ferrules positioned along a longitudinal axis with high accuracy and precision.

The term "tunable FFP filter" refers to an optical filter in which the wavelengths or frequencies of the transmission output of the filter is selectably changed, shifted or tuned by changing the optical path length through the resonance cavity of the FFP.

The term "fixed frequency FFP filter" refers to an optical filter in which the wavelengths or frequencies of the transmission output of the filter is substantially constant. In preferred embodiments of the present invention, the optical path length of light through the resonance cavity of a fixed frequency FFP filter is substantially constant.

"Unitary body" refers to a body or object made up of a continuous single material or made up of separate components that are operationally attached to each other. Unitary bodies do not comprise physically separated, discontinuous elements. Preferred unitary bodies are fabricated from a single material. However, a unitary body may comprise a plurality of components that are connected by a fastener such as a weld joint, glue, epoxy, a screw, bolt, clamp, a clasp, or any equivalent of these. Unitary bodies may comprise elements prepared in separate portions and assembled via bonding, welding, joining, adhering, marrying, fastening, clamping, bolting, fixing, or any combination of these.

The terms "precision", "precise" and "precisely controlled" and "high tolerance" as employed herein in reference to alignment refer to matching to a minimum precision of about 0.001 inch and more preferably about 0.0001 inch.

"Actuator" refers to a device, device component or element capable of moving or controlling something. Exemplary actuators of the present invention are capable of generating a force, preferably a force that is parallel to the longitudinal axis of a unitary body. Exemplary actuators of this invention are applied to selectably adjust the optical path length of a resonance cavity, thereby selectably adjusting the transmission properties of a FFP filter, namely free spectral range and resonance frequencies.

"Coefficient of thermal expansion" refers to a parameter which characterizes the change in size that a material undergoes upon experiencing a change in temperature. Linear thermal expansion coefficient is a parameter which characterizes the change in length a material undergoes upon experiencing a change in temperature and may be expressed by the equation:

$$\Delta L = \alpha L_o \Delta T \quad \text{(II)}$$

wherein $\Delta L$ is the change in length, a is the linear coefficient of thermal expansion, $L_o$ is the initial length and $\Delta T$ is the change in temperature.

"Spring" refers to an elastic body or device that recovers its original shape when released after being distorted. Springs of the present invention may have a variety modulus of elasticity, such as the modulus associated with stainless steel alloy springs. Springs of the present invention may comprise a curved or bent body that can be pressed into a smaller space but upon release returns to its initial shape. The term "non-folded beam spring" refers to a material or body having a single relieved channel, preferably a rectangular or U-shaped channel, which may be compressed or expanded upon the application of a force. The term "folded beam spring" refers to a material or body having at least one relieved channel, thereby creating a beam with one or more folds, which may be compressed or expanded upon the application of a force.

"Parallel to the longitudinal axis" refers to a direction that is defined by an axis that is equidistant from the longitudinal axis at all points. Substantially parallel refers to a direction wherein the angular deviation from absolute parallelism is not significant enough to cause misalignment of the ferrules held in the ferrule holders of the present invention. For some applications, substantially parallel encompasses deviations from absolute parallelism that are less than or equal to about 0.1 degrees.

"Optical path length" refers to the effective path length of light taking into consideration both the physical path length and the refractive index of the region that the light is propagating through. Analytically, optical path length may be expressed by the following summation:

$$\text{optical path length} = \sum_x = n_x \times L_x, \quad \text{(III)}$$

where $L_x$ is the physical thickness of region x and n is the refractive index of region x.

"Longitudinal temperature compensation" refers to a characteristic of the ferule holders of the present invention wherein unwanted variation of the distance between internal ends of ferrules held within the holder due to changes in temperature is minimized. In the context of FFP filters of the present invention, "longitudinal temperature compensation" refers to a characteristic of the FFP filters wherein unwanted variation of the optical path length through the resonance cavity due to changes in temperature is minimized.

"Radial temperature compensation" refers to a characteristic of the ferule holders of the present invention wherein unwanted variation of the position ferrules held within the holder in all directions other than a direction along the longitudinal axis due to changes in temperature is minimized.

"dB" refers to a unit of measure provided by the equation:

$$dB = 10 \times LOG\left(\frac{I_{out}}{I_{in}}\right) \quad (IV)$$

where $I_{out}$ is the intensity of light propagating through an optical device and $I_{in}$ is the intensity of light incident on an optical device.

"Substantially matching" the coefficients of thermal expansion of materials used for the ferrule holders and ferrules of the present invention refers to selection of materials having coefficients of thermal expansion sufficiently close in value for use in a given holder design or configuration such that the wavelength drift, insertion loss or both of a FFP filter is minimized.

In the following description, numerous specific details of the devices, device components and methods of the present invention are set forth in order to provide a thorough explanation of the precise nature of the invention. It will be apparent, however, to those of skill in the art that the invention can be practiced without these specific details. Reference in the specification to "a preferred embodiment," "a more preferred embodiment" or "an exemplary embodiment" means that a particular feature, structure, or characteristic set forth or described in connection with the embodiment is included in at least one embodiment of the invention. Reference to "preferred embodiment," "a more preferred embodiment" or "an exemplary embodiment" in various places in the specification do not necessarily refer to the same embodiment.

This invention provides ferrule holders and FFP filters having good radial alignment, good longitudinal alignment and desirable temperature compensation. In particular, the present invention provides ferrule holders, which are particularly useful for fixed frequency—FFP filters, tunable FFP filters and devices for measuring ambient conditions, physical properties and physical phenomena.

Figure 3A:
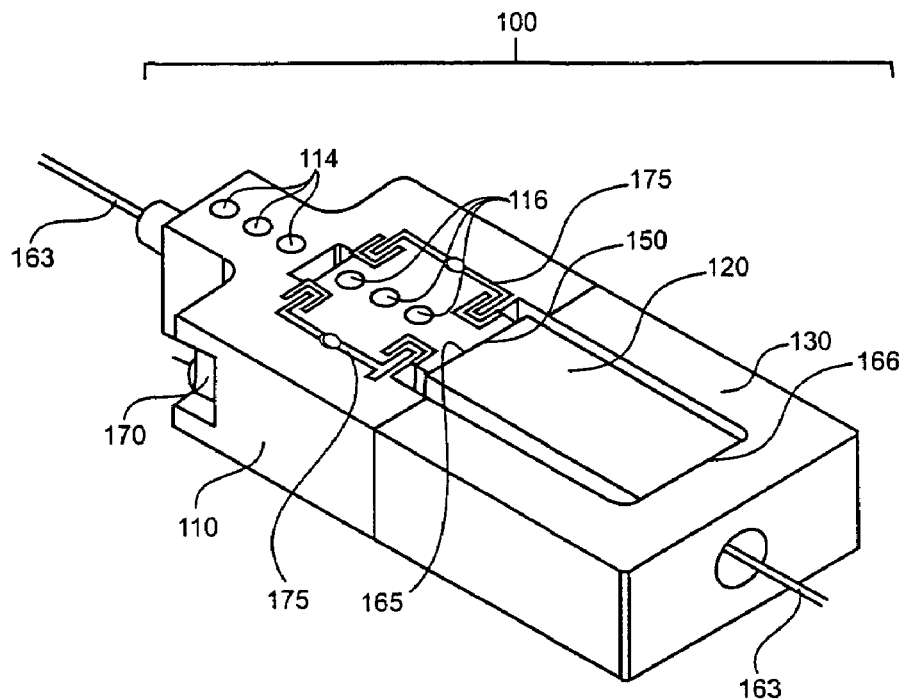
FIG. 3A is a schematic drawing showing a perspective view of a ferrule holder of the present invention.
Figure 3B:
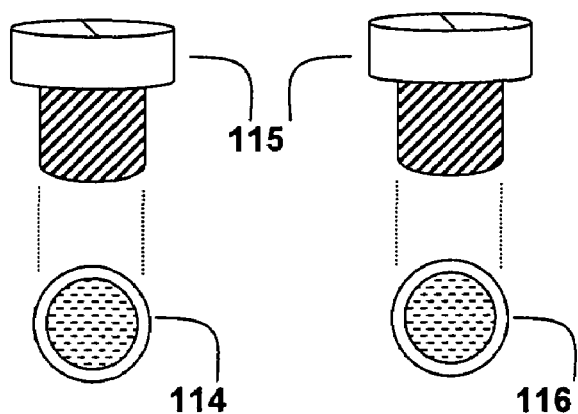
FIG. 3B is a schematic drawing showing that the fastening elements can be a screw and a tapped hole.
Figure 4A:
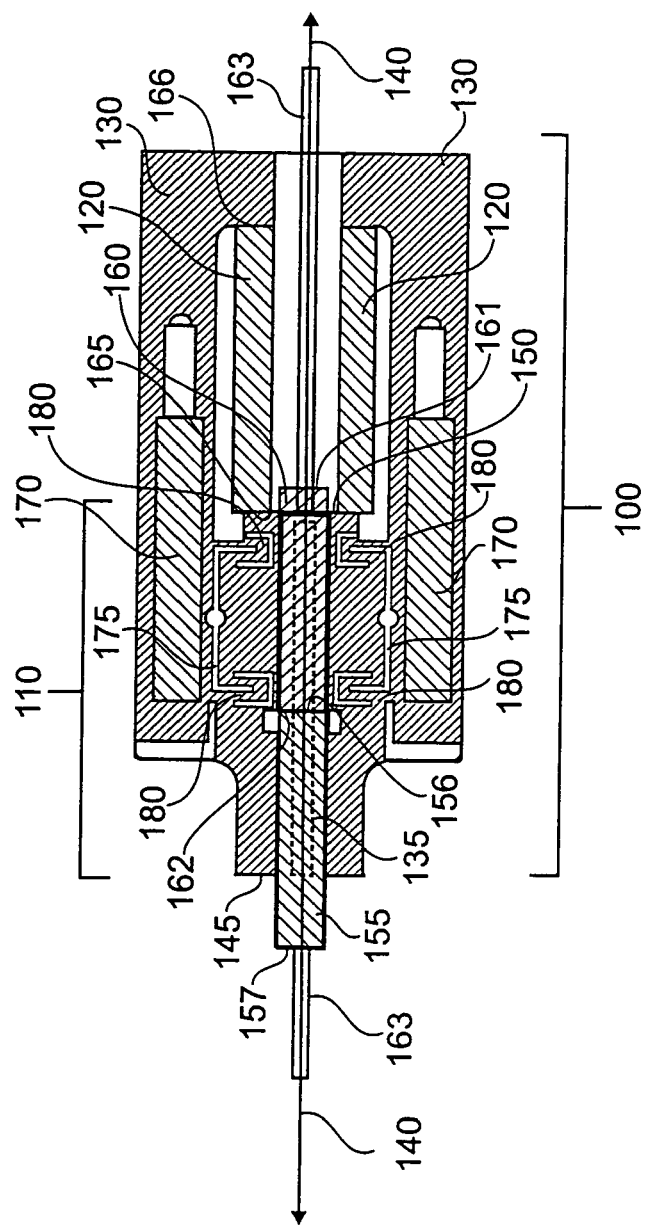
FIG. 4A is a schematic drawing showing a cross sectional view of a ferrule holder of the present invention.
Figure 4C:
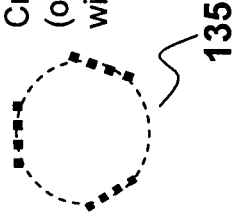
FIGS. 4B and 4C are schematic drawings showing the cross-sectional shape of the axial bore can be triangular or generally cylindrical with three substantially flat surfaces.
Figure 4B:
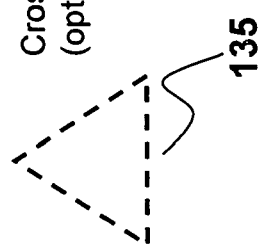

FIGS. 3 and 4 illustrate an exemplary embodiment of a ferrule holder of the present invention capable of maintaining good radial and longitudinal alignments, preferably high precision and accuracy alignment. Specifically, FIG. 3 provides a perspective view and FIG. 4 provides a cross sectional view. The illustrated ferrule holder 100 comprises unitary body 110, first ferrule fastening element 114, second ferrule fastening element 116, actuator 120 and mounting strap 130. Unitary body 110 has axial bore 135 extending along longitudinal axis 140. Unitary body 110 has a first end 145 for receiving a first ferrule 155 having an external face 157 and an internal face 156 and a second end 150 for receiving a second ferrule 160 having an external face 161 and an internal face 162. Optical fibers 163 are held within axial bores located within first and second ferrules. First ferrule 155 and second ferrule 160 are oriented such that their internal and external faces are transverse to longitudinal axis 140 and such that internal face 156 and internal face 162 oppose each other. In embodiments comprising a FFP filter, reflectors (not shown) are provided at the end of optical fibers 163 which terminate at the internal ends of the first and second ferrules, thereby by forming an optical resonance cavity between opposing reflectors. Alternative embodiments may further comprise one or more waveguides or wafers (not shown) positioned within the optical resonance cavity. Wafers and waveguides may be operationally coupled to reflectors on optical fibers 163. Actuator 120 has an internal end 165 and external end 166 and is oriented such that internal end 165 is in operational contact with second end 150 of unitary body 110 and external end 166 is in operational contact with mounting strap 130. Mounting strap fasteners 170 are also provided for securing mounting strap 130 to unitary body 110. Exemplary mounting strap fasteners 170 comprise stainless steel screws.

In the preferred embodiment illustrated in FIGS. 3 and 4, a system of channels 175 is created in unitary body 110 providing elasticity with respect to compression, expansion or both along longitudinal axis 140. As shown in FIGS. 3 and 4, the channels are oriented perpendicular to the longitudinal axis 140 and the system of channels 175 creates four folded beam springs 180, each having a single fold, in unitary body 110. Actuator 120 is operationally connected to second end 150 of unitary body 110 in a manner creating a preload on springs 180, preferably a preload selected over the range of about 50 pounds to about 300 pounds. The system of channels 175 allows movement of second ferrule 160 in a direction substantially parallel to the longitudinal axis. In a preferred exemplary embodiment, second ferrule 160 is capable of moving up to about 3 microns in length along the longitudinal axis.

In a preferred embodiment, actuator 120 is a piezoelectric transducer that transforms electrical energy into mechanical energy by utilizing the piezoelectric longitudinal effect. In this embodiment, application of an electric potential to actuator 120 results in an elongation of actuator 120 such that a force is generated substantially parallel to the longitudinal axis 140. Due to the presence of mounting strap 130, this force is directed toward the second end 150 of unitary body 110 resulting in compression of springs 180. Because first ferrule 155 and second ferrule 160 are fastened in axial bore 135 by fastening elements 114 and 116, this compression results in a variation of the distance between internal face 156 of first ferrule 155 and internal face 162 of second ferrule 160.

In an exemplary embodiment, unitary body extends 110 extends about 0.8 inches in length along longitudinal axis and has ferrule contact regions extending about 0.31 inches along the longitudinal axis for both first and second ferrules. Exemplary first and second ferrules are single-mode, ceramic ferrules which extend about 0.50 inches in length along the longitudinal axis. An exemplary actuator, comprises a piezoelectric transducer element having dimensions of about 8 mm by 8 mm by 16 mm, wherein the transducer extends about 16 mm in length along the longitudinal axis. While piezoelectric transducers having other dimensions are useable in the present invention, preferred piezoelectric transducers for some applications have dimensions greater than about 5 mm by 5 mm by 10 mm.

Unitary body 110 may comprise any material that exhibits some elasticity and is able to provide rigid support for the first and second ferrules in all directions other than a direction parallel to the longitudinal axis. In preferred embodiments, the unitary body is fabricated from a single piece of material having a single, continuous axial bore therein. Use of a single material having a continuous axial bore is preferred to ensure good alignment of the ferrules held in the ferrule holder. However, the present invention includes embodiments wherein the unitary body is fabricated from a plurality of components that are operationally connected via an appropriate means of fastening including but not limited to a weld joint, glue, epoxy, a screw, clamp, bolt, a clasp, or any equivalent of these.

In embodiments comprising temperature compensated ferrule holders, the unitary body is preferably fabricated from a material having a coefficient of thermal expansion substantially matched to that of the material comprising the first and second ferrules. For example, use of stainless steel alloys, preferably having a coefficient of thermal expansion of about 9.9 ppm/° C., in the fabrication of the unitary body is desirable for use with ceramic ferrules, such as ziconia ceramic ferrules, which have a coefficient of thermal expansion of about 9.4 ppm/° C. Alternatively, use of low expansion electronic alloys, such as Invar and Kovar, in the fabrication of the unitary body is desirable for use with Pyrex ferrules, Quartz ferrules, and glass ferrules.

Figure 5A:
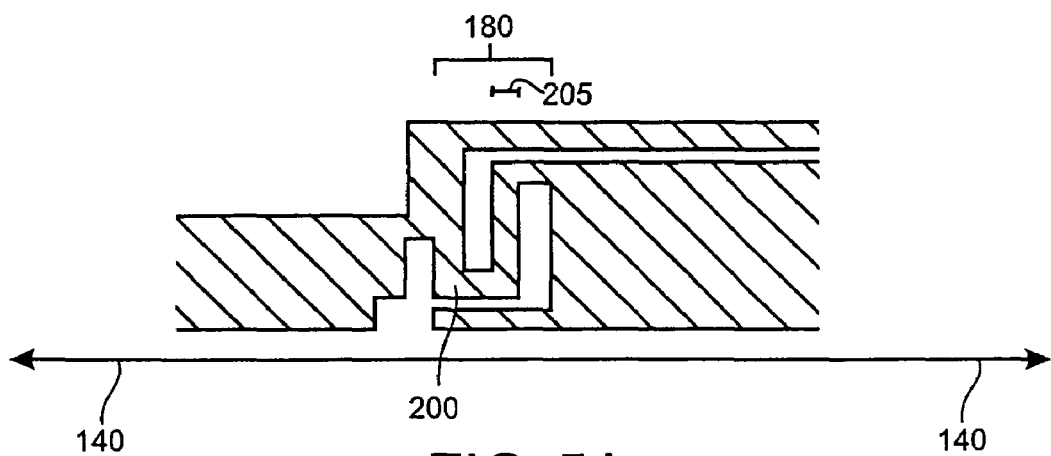
FIGS. 5A–C are schematic drawings of spring configurations useable in the methods, devices and device components of the present invention.
Figure 5B:
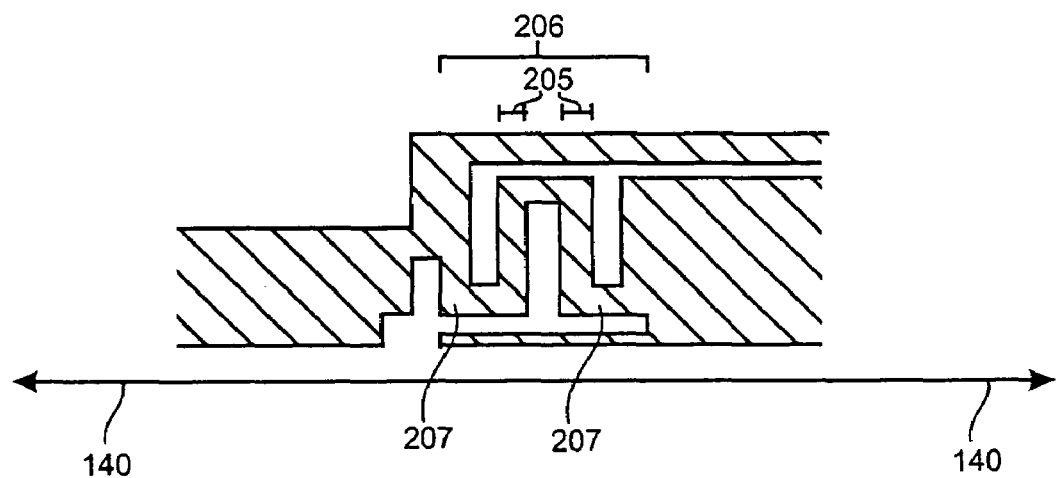
Figure 5C:
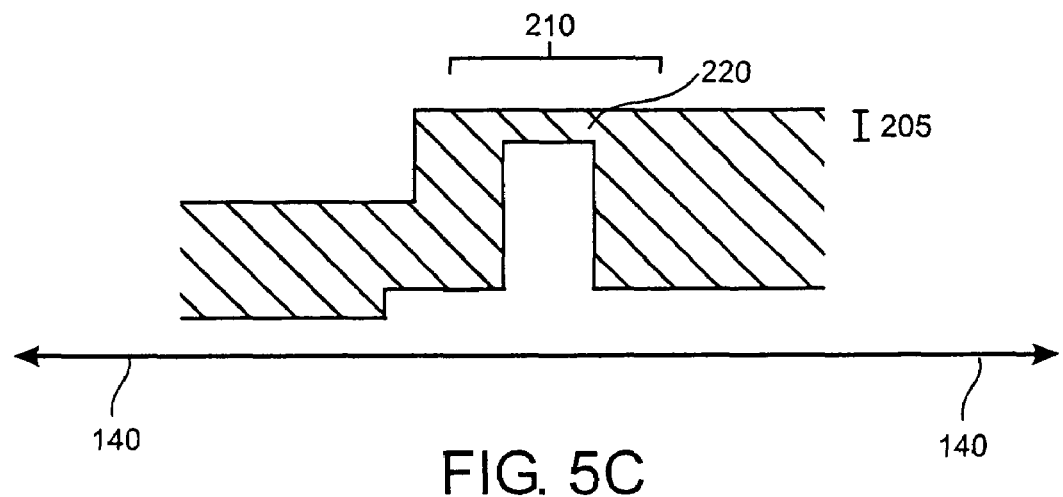

The folded beam spring configuration shown in FIG. 4 is but one means of providing elasticity to the ferrule holders of the present invention. In the present invention any spring configuration is employable that provides elasticity with respect to compression or expansion along the longitudinal axis and also substantially constrains motion along all other dimensions. Springs of the present invention may have a range of force constants and preloads that provide a useful range of optical path lengths from the internal face of the first ferrule to the internal face of the second ferrule. In addition, ferrule holders of the present invention can have any number of springs. Preferred spring systems in the present invention provide a net elasticity of the unitary body that is substantially symmetric about the longitudinal axis to prevent parasitic motion in the other axes. FIG. 5A shows an expanded view of a folded beam spring 180 useable in the present invention having a single fold 200 with a selected beam cross section 205. Alternative embodiments of the present invention comprise folded beam springs having a plurality of folds and a variety of beam cross sections. For example, FIG. 5B shows an alternative folded beam spring 206 having two folds 207 with a selected beam cross section 205. FIG. 5C shows an alternative non-folded beam spring configuration 210 useable in the present invention having a non-folded beam 220 with a selected beam cross section 205. Thinner beam cross sections are preferred for non-folded beam spring configurations to provide the desired elasticity along the longitudinal axis.

Actuators of the present invention may be any material, device or device component capable of generating a force substantially parallel to the longitudinal axis. Actuators of the present invention may be operationally connected to the second end, first end or both of the unitary body. Actuators of the present invention may be operationally connected such that upon generation of a force substantially parallel to the longitudinal axis the unitary body undergoes compression or expansion along the longitudinal axis. In an exemplary embodiment, an actuator is positioned between the first and second ends of the unitary body and is capable of expanding and contracting the unitary body. Such an embodiment provides a ferrule holder useful for tunable FFP filters.

Preferred actuators for ferrule holders for tunable FFP filters comprise materials having a selectable adjustable length along the longitudinal axis. Exemplary actuators of the present invention include, but are not limited to, materials capable of elongation upon the application of an electric potential, such as piezoelectric transducers, electro-optic modulators and electrorestrictive materials. These actuators are especially useful for ferrule holders for tunable FFP filters having an optical path length of light through the resonance cavity selected from the range of about 1 micron to about 2 millimeters.

Exemplary actuators useful for devices for measuring physical properties, ambient conditions or mechanical phenomena comprise a material, device or device component capable of providing a force substantially parallel to the longitudinal axis that systematically varies with the property, condition or phenomena being monitored. For example, use of a material having a coefficient of thermal expansion different from the coefficient of thermal expansion of the material comprising the unitary body provides an actuator capable of generating a force substantially parallel to the longitudinal axis that varies systematically and predictably with temperature. FFP filters having such actuators may comprise sensitive temperature transducers. Selection of the difference between the coefficients of thermal expansion of the actuator and unitary body establishes the sensitivity and temperature range of the temperature transducers of the present invention. Selection of a larger difference in the coefficients of thermal expansion results in a more sensitive transducer capable of detecting and characterizing temperatures and temperature changes over a smaller temperature range. In contract, selection of a smaller difference in the coefficients of thermal expansion results in a less sensitive transducer capable of detecting and characterizing temperatures and temperature changes over a larger temperature range. Preferred FFP filters capable of sensitive temperature measurements are capable of providing a change in resonance cavity path length of one optical order, for example 0.775 micron at 1550 nm, over the measured temperature range.

Any fastening element providing a means of fastening a ferrule to the unitary body are employable in the present invention. In a preferred embodiment, axial bore 135 is shaped to include three substantially flat regions such that first ferrule 155 and second ferrule 160 can be secured by fastening elements 114 and 116 in a manner providing three points of contact around the circumference of the ferrule. Exemplary axial bore shapes include, but are not limited to, triangularly shape axial bores (see FIG. 4B) and generally cylindrically shaped axial bores having three substantially flat surfaces for establishing contacting with the ferrules (see FIG. 4C). Preferred fastening elements comprise a plurality of tapped holes for receiving screws 115 (see FIG. 3B) positioned in and along the length that the unitary body which extends along the longitudinal axis and screws positioned in each hole. More preferred embodiments, further comprise a ferrule retention element located between the bottom of the tapped holes and the first and second ferrule. Exemplary fastening elements may comprise screws, bolts, clamps, epoxies, glues, cables, hooks or any combination of these.

Figure 6:
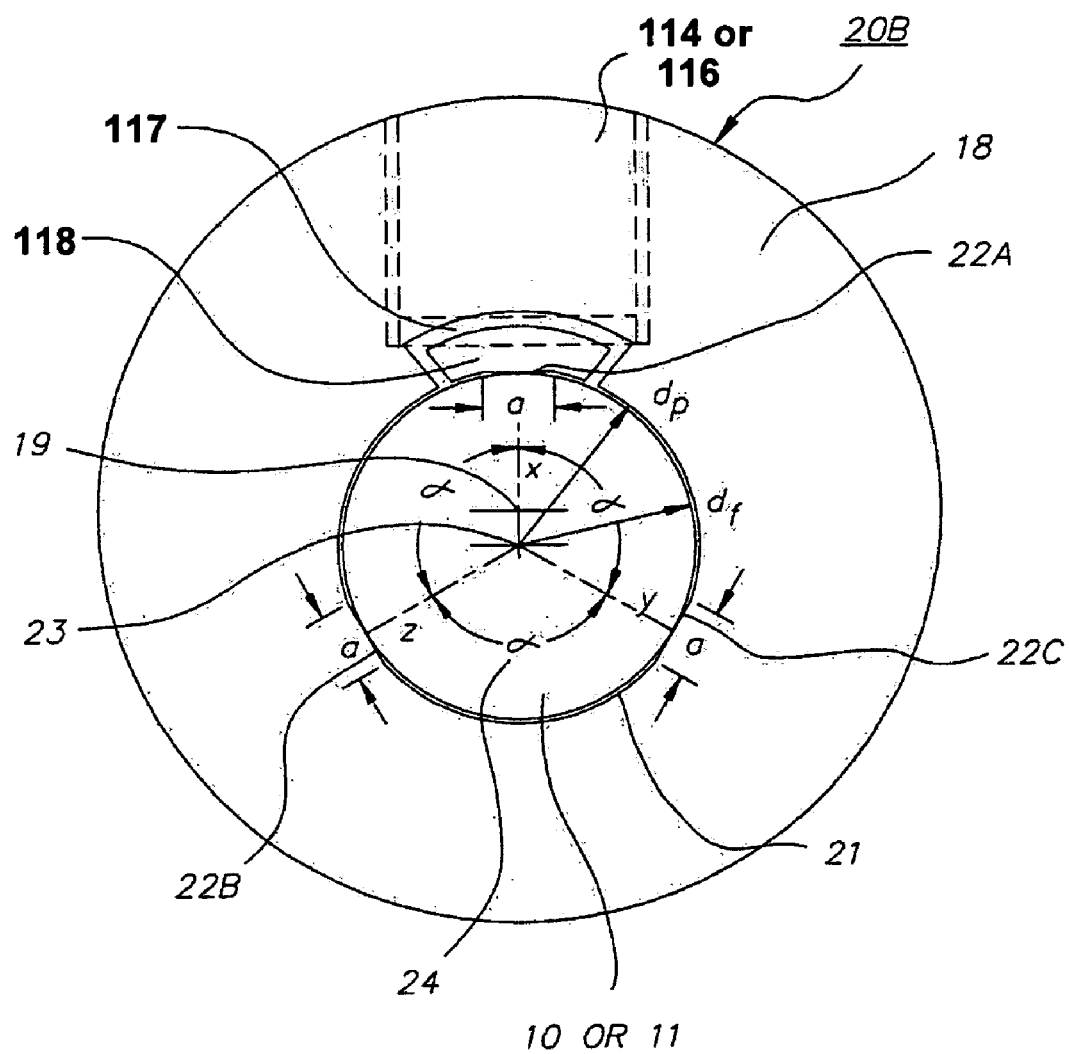
FIG. 6 (from U.S. Pat. No. 5,422,970) is a cross-sectional view of another ferrule holder of this invention. This ferrule holder has a retention means having a resilient arm and an element separate from the holder body.

FIG. 6 (from FIG. 6 of U.S. Pat. No. 5,422,970) illustrates a ferrule holder having another alternate ferrule retention means, a separate element 117, positioned intermediate between the bottom of the tapped holes 114 and the ferrule in the passageway. Element 117 is separate from the body of the ferrule holder positioned and held within retaining channel 118 on the holder. Element 117 can be made of the same or different material than the body of the holder. This channel and element are sized and shaped with respect to each other such that the element is held within the channel but can be displaced downwardly by applying a radial force, such as by tightening a screw into the tapped hole 114 or 116. For convenience of machining, channel 118 and the ferrule retention element 117 therein extend the length of the ferrule holder. Alternatively, a channel and ferrule retention element can be positioned under each tapped hole along the length of the ferrule. The remaining numerical identifiers in FIG. 6 are as described in U.S. Pat. No. 5,422,970.

In a preferred embodiment, the fiber holder illustrated in FIGS. 3 and 4 is temperature compensated to minimize the change in the distance along the longitudinal axis separating the internal faces of the first and second ferrules during temperature cycling or changes in temperature. Temperature compensated ferrule holders of the present invention are especially useful for fixed frequency and tunable FFP filters having minimized wavelength drift over a useful range of operating temperatures, such as a temperature range of about −20° C. to about 85° C. Radial temperature compensation of the ferrule holder of the present invention may be accomplished by substantially matching the coefficients of thermal expansion of the materials comprising the ferrule holder and the material comprising the ferrules. By substantially matching the coefficients of thermal expansion, the radial forces exerted on the ferrule by the ferrule holder will remain nearly constant when subjected to temperature cycling or changes in temperature.

For many applications involving FFP filters of the present invention, ferrule holders of the present invention must be temperature compensated to minimize the undesired effect of ambient temperature changes on cavity length. Longitudinal temperature compensation may be achieved by balancing the coefficients of thermal expansion of the material chosen for the mounting strap or retainer with the material chosen for the actuator. For example, low voltage piezoelectric transducers typically have low, negative coefficients of thermal expansion, such as about −3 ppm/° C. By choosing a material for the mounting strap or retainer having an appropriate coefficient of thermal expansion, the net combination of piezoelectric transducer actuator and mounting strap may be thermally balanced to minimize variation in the optical path length of light through the resonance cavity with temperature. As thermal expansion is an extensive property dependent on the amount of material undergoing a temperature change, temperature compensation may also be accomplished by selective variation of the amount of material comprising the various components of the ferrule holder of the present invention. In many cases an optimal configuration providing temperature compensation is determined empirically by an iterative processes involving directly measuring the change in cavity length experienced upon a given change in temperature and making adjustments to the components to minimize the change in resonance cavity optical path length due to temperature. In another exemplary embodiment, temperature compensation can also be adjusted by variation of the tension of screws comprising the mounting strap fasteners. For example, by increasing the screw torque, the tension in the screw and compressive forces in the mounting strap may effectively reduce the coefficient of thermal expansion of the mounting strap.

In an exemplary embodiment, a temperature compensated FFP filter having a having zirconia ferrules, an Invar mounting strap, a piezoelectric transducer actuator, a stainless steel unitary body and stainless steel screw mounting strap fasteners exhibits a wavelength drift of less than about 1 FSR/100° C. over the temperature range of about −20° C. to about 85° C. Moreover, this exemplary temperature compensated FFP filter exhibits an insertion loss after multiple temperature cycles over the range of about −20° C. to about 85° C. of less than 0.5 dB. Further, using standard wavelocking techniques, these exemplary FFP filters require locking voltages having a magnitude less than about ±10 volts to maintain a desired wavelength over the entire temperature range tested.

Ferrule holders of the present invention may be efficiently fabricated using electron discharge machining (EDM) techniques, which are well known in the art. For example, the unitary body component, as illustrated in FIGS. 3 and 4, may be fabricated from a single piece of material by using EDM techniques to relieve material from the unitary body, thereby generating channels comprising a plurality of bent beam springs. The axial bore of the unitary body may also be machined using wire-EDM techniques. In this exemplary method of fabricating the ferrule holders of the present invention, good radial alignment of the ferrules is ensured since the ferrules are mounted in a single, continuous axially bore. In addition, since the mount for both ferrules is machined into a single piece of material, no additional assembly or alignment is required to ensure good ferrule alignment. Ferrule holders of the present invention may also be fabricated using laser cutting techniques.

FFP filters of the present invention may comprise device components in a variety of optical devices including but not limited to lasers, wavelockers, optical signal generators, dense and coarse wavelength division multiplexers and demultiplexers, light filters, interleavers, optical sources, detectors, fiber optic routing devices, optical alignment systems, add/drop filters and interferometers, temperature transducers, pressure transducers, instruments for measuring force, accelerometers and displacement transducers. Ferrule holder and FFP filters of the present invention may be directly or indirectly operationally coupled to a variety of devices including but not limited to lasers, detectors, reflectors, polarizers, interference filters, fiber optic couplers, light sources, and temperature controllers. FFP filters of the present invention may be use separately to provide optical filtering or a series of the FFP filters of the present invention may be used to provide optical filtering.

All references cited in this application are hereby incorporated by reference in their entireties to the extent that they are not inconsistent with the disclosure in this application. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques specifically described herein are intended to be encompassed by this invention.

I claim:

1. A ferrule holder for a fiber filter comprising:
   a unitary body having an axial bore extending along a longitudinal axis, said axial bore having a first end for receiving a first ferrule and a second end for receiving a second ferrule, wherein at least a portion of said unitary body is elastic with respect to expansion, compression or both along the longitudinal axis, wherein said first ferrule has an internal face and an external face each of which are oriented transverse to the longitudinal axis and said second ferule has an internal face and an external face each of which are oriented transverse to the longitudinal axis and wherein said first and second ferrules are positioned such that their internal faces are opposed, wherein said internal faces are separated by an optical resonance cavity distance;
   a first ferrule fastening element for securing the first ferrule in the unitary body; and
   a second ferrule fastening element for securing the second ferrule in the unitary body;

wherein the longitudinal elasticity of the unitary body allows for variation of the optical resonance cavity distance between the internal faces of the first and second ferrules in a direction substantially parallel to said longitudinal axis while maintaining alignment of the first and second ferrule in all other directions, wherein said longitudinal elasticity of the unitary body is provided by a system of channels created in said unitary body, wherein the channels are oriented perpendicular to the longitudinal axis, and wherein said optical resonance cavity distance is selectably adjustable.

2. The fiber ferrule holder of claim 1 wherein the elasticity of the unitary body allows for movement of said first ferrule in a direction substantially parallel to said longitudinal axis.

3. The fiber ferrule holder of claim 1 wherein the elasticity of the unitary body allows for movement of said second ferrule in a direction substantially parallel to said longitudinal axis.

4. The fiber ferrule holder of claim 1 wherein the elasticity of the unitary body allows for movement of said first ferrule and said second ferrule in a direction substantially parallel to said longitudinal axis.

5. The fiber ferrule holder of claim 1 wherein the elasticity of the unitary body allows for variation of the first ferrule, second ferrule or both in a direction substantially parallel to said longitudinal axis.

6. The fiber ferrule holder of claim 1 wherein the elasticity is substantially symmetric about the longitudinal axis.

7. The fiber ferrule holder of claim 1 wherein the system of channels creates at least one spring in the unitary body.

8. The fiber ferrule holder of claim 7 wherein the spring comprises a non-folded beam spring.

9. The fiber ferrule holder of claim 7 wherein the spring comprises a folded beam spring.

10. The fiber ferrule holder of claim 1 wherein the system of channels is relieved from the unitary body using wire electron discharge machining methods.

11. The fiber ferrule holder of claim 1 wherein the unitary body is fabricated from a material having sufficient elasticity to provide a variation of the distance between the internal faces of the first and second ferrules up to a distance along the longitudinal axis equal to about 3 microns.

12. The fiber ferrule holder of claim 1 wherein the distance between the internal faces of the first and second ferrules along the longitudinal axis varies with ambient environmental conditions.

13. The fiber ferrule holder of claim 1 wherein the unitary body is fabricated from a stainless steel alloy.

14. The fiber ferrule holder of claim 1 wherein the unitary body is fabricated from a material having a coefficient of thermal expansion substantially matched to the material comprising first and second ferrules.

15. The fiber ferrule holder of claim 14 wherein the unitary body is fabricated from a material having a coefficient of thermal expansion selected from the range of about 9 ppm/° C. to about 10 ppm/° C.

16. The fiber ferrule holder of claim 1 wherein the unitary body provides rigid support for the first and second ferrules in all directions except a direction parallel to the longitudinal axis.

17. The fiber ferrule holder of claim 1 wherein the axial bore is shaped along the longitudinal axis to provide substantially flat surfaces for three point contact between the first ferrule, second ferrule or both and the unitary body.

18. The fiber ferrule holder of claim 1 wherein said first ferrule fastening element and said second ferrule fastening element comprise:

a plurality of tapped holes for receiving screws positioned in and along the length that the unitary body extends along the longitudinal axis; and screws in each of the tapped holes;

wherein the position of said screws in the tapped holes is selectably adjustable to provide forces on the first and the second ferrules which establishes three points of contact within axial bore of the unitary body.

19. The ferrule holder of claim 18 wherein the axial bore is triangular having three substantially flat surfaces along the longitudinal axis for contacting said first and second ferrules and wherein said plurality of tapped screw holes is positioned above one of said flat surfaces.

20. The ferrule holder of claim 18 wherein the axial bore is generally cylindrical but has three substantially flat surfaces along the longitudinal axis for contacting said first and second ferrules and wherein said plurality of tapped screw holes is positioned above one of said substantially flat surfaces.

21. The fiber ferrule holder of claim 1 further comprising a ferrule retention element located between the bottoms of the tapped holes and said first ferrule, second ferrule or both.

22. The ferrule holder of claim 1 further comprising an actuator operationally coupled to the unitary body for selectably adjusting the distance between the internal ends of the first and second ferrules.

23. A fiber ferrule holder for a fiber Fabry-Perot filter comprising:

a unitary body having an axial bore extending along a longitudinal axis, said axial bore having a first end for receiving a first ferrule and a second end for receiving a second ferrule, wherein at least a portion of said unitary body is elastic with respect to expansion, compression or both along the longitudinal axis, wherein said first ferrule has an internal face and an external face each of which are oriented transverse to the longitudinal axis and said second ferule has an internal face and an external face each of which are oriented transverse to the longitudinal axis and wherein said first and second ferrules are positioned such that their internal faces are opposed, wherein said internal faces are separated by an optical resonance cavity distance;

a first ferrule fastening element for securing the first ferrule in the unitary body; and a second ferrule fastening element for securing the second ferrule in the unitary body; and an actuator having an internal end and an external end for selectably adjusting the optical resonance cavity distance between the internal faces of the first and second ferrules along the longitudinal axis, wherein the internal end of the actuator is operationally coupled to the unitary body, wherein the elasticity of the unitary body allows for selectable variation of the optical resonance cavity distance between the internal faces of the first and second ferrules in a direction substantially parallel to said longitudinal axis while maintaining alignment of the internal faces of the first and second ferrule in all other directions, wherein said longitudinal elasticity of the unitary body is provided by a system of channels created in said unitary body, wherein the channels are oriented perpendicular to the longitudinal axis.

24. The fiber ferrule holder of claim 23 further comprising a mounting strap operationally coupled to the actuator for fixing the position of the external end of the actuator.

25. The fiber ferrule holder of claim 23 wherein the actuator generates a force such that the unitary body compresses along the longitudinal axis, thereby decreasing the distance between the internal faces of the first and second ferrules along the longitudinal axis.

26. The fiber ferrule holder of claim 23 wherein the actuator generates a force such that the unitary body expands along the longitudinal axis, thereby increasing the distance between the internal faces of the first and second ferrules along the longitudinal axis.

27. The ferrule holder of claim 23 wherein the actuator generates a force on the first end, second end or both of the unitary body.

28. The fiber ferrule holder of claim 23 wherein the actuator comprises a piezoelectric transducer, wherein application of an electric potential to said piezoelectric transducer results in expansion or contraction of the piezoelectric transducer in a direction a parallel to longitudinal axis and wherein the expansion of the piezoelectric transducer generates a force on the unitary body.

29. The fiber ferrule holder of claim 23 wherein the piezoelectric transducer is a single rectangular prism-shaped piezoelectric transducer.

30. The fiber ferrule holder of claim 23 wherein the mounting strap comprises a selected amount of a material having a coefficient of thermal expansion such that the combination of the mounting strap and the piezoelectric transducer does not undergo substantial expansion or contraction over the temperature range of about −20° C. to about 85° C.

31. The fiber ferrule holder of claim 24 further comprising at least one mounting strap fastener element.

32. The fiber ferrule holder of claim 23 wherein the actuator comprises an electrostrictive material.

33. The fiber ferrule holder of claim 23 wherein the actuator comprises a spring or diaphragm.

34. The fiber ferrule holder of claim 23 further comprising a second actuator operationally coupled to the unitary body.

35. The fiber ferrule holder of claim 23 wherein the actuator comprises a material having a coefficient of thermal expansion different than that of the unitary body.

36. The fiber ferrule holder of claim 35 wherein coefficient of thermal expansion of the actuator is about 1.5 times greater or less than the coefficient of thermal expansion of the unitary body.

37. A fiber Fabry-Perot filter comprising:
   a fiber ferrule assembly having an optical resonance cavity therein which comprises a first and a second ferrule element each of which has an axial bore along a longitudinal axis therethrough for receiving an optical fiber and a reflector transverse to the axial bore, said first and second ferrules each having an internal face oriented transverse to the longitudinal axis, wherein said ferrules are positioned with respect to each other such that the internal faces of the ferrules are opposed, wherein said internal faces are separated by a distance thereby forming an optical resonance cavity between opposing reflectors;
   a unitary body having an axial bore extending along the longitudinal axis, said axial bore having a first end for receiving the first ferrule and a second end for receiving the second ferrule, wherein at least a portion of said unitary body is elastic with respect to expansion, compression or both along the longitudinal axis;
   a first ferrule fastening element for securing the first ferrule in the unitary body; and
   a second ferrule fastening element for securing the second ferrule in the unitary body;
   wherein the elasticity of the unitary body allows for variation of the distance between the internal faces of the first and second ferrules in a direction substantially parallel to said longitudinal axis while maintaining alignment of the internal faces of the first and second ferrule in all other directions, wherein said longitudinal elasticity of the unitary body is provided by a system of channels created in said unitary body, wherein the channels are oriented perpendicular to the longitudinal axis, and wherein said distance between the internal faces of the first and second ferrules is selectably adjustable.

38. The fiber Fabry-Perot filter of claim 37 further comprising an actuator operationally coupled to the unitary body for selectably adjusting the optical path length of light through the resonance cavity.

39. The fiber Fabry-Perot filter of claim 38 comprising a tunable fiber Fabry-Perot filter.

40. The fiber Fabry-Perot filter of claim 38 comprising a fixed frequency fiber Fabry-Perot filter.

41. The fiber Fabry-Perot filter of claim 38 comprising a temperature transducer.

42. The fiber Fabry-Perot filter of claim 38 comprising a displacement transducer.

43. The fiber Fabry-Perot filter of claim 38 comprising a device for measuring force.

44. The fiber Fabry-Perot filter of claim 38 comprising a device for measuring pressure.

45. The fiber Fabry-Perot filter of claim 38 comprising an accelerometer.

* * * * *